(12) United States Patent
Boregowda et al.

(10) Patent No.: US 7,664,329 B2
(45) Date of Patent: Feb. 16, 2010

(54) BLOCK-BASED GAUSSIAN MIXTURE MODEL VIDEO MOTION DETECTION

(75) Inventors: Lokesh R. Boregowda, Bangalore (IN); Mohamed M. Ibrahim, Kayalpatnam (IN)

(73) Assignee: Honeywell International Inc., Morristown, NJ (US)

( * ) Notice: Subject to any disclaimer, the term of this patent is extended or adjusted under 35 U.S.C. 154(b) by 758 days.

(21) Appl. No.: 11/366,318

(22) Filed: Mar. 2, 2006

(65) Prior Publication Data

US 2007/0206865 A1  Sep. 6, 2007

(51) Int. Cl.
 *G06K 9/62* (2006.01)
(52) U.S. Cl. .................. 382/225; 382/103; 382/164; 382/173
(58) Field of Classification Search ............. 382/103, 382/224, 225, 232, 164, 173; 707/E17.028; 715/723
See application file for complete search history.

(56) References Cited

U.S. PATENT DOCUMENTS

| | | | |
|---|---|---|---|
| 7,039,232 B2 * | 5/2006 | Nagarajan et al. | 382/173 |
| 7,106,901 B2 * | 9/2006 | de Queiroz | 382/176 |
| 7,246,314 B2 * | 7/2007 | Foote et al. | 715/700 |
| 7,379,593 B2 * | 5/2008 | Fan et al. | 382/173 |
| 2005/0276446 A1 * | 12/2005 | Chen et al. | 382/103 |
| 2007/0206865 A1 * | 9/2007 | Boregowda et al. | 382/225 |
| 2007/0237393 A1 * | 10/2007 | Zhang et al. | 382/173 |
| 2008/0137950 A1 * | 6/2008 | Park et al. | 382/168 |
| 2009/0067716 A1 * | 3/2009 | Brown et al. | 382/173 |

OTHER PUBLICATIONS

Collins, R., "A System for Video Surveillance and Monitoring", *Tech. Report CMU-RI-TR-00-12, Robotics Institute, Carnegie Mellon University,* (May 2000),1-69.

Cucchiara, R., "Detecting moving objects, ghosts, and shadows in video streams", *IEEE Transactions on Pattern Analysis and Machine Intelligence,* 25(10), (Oct. 2003),1337-1342.

Friedman, N., "Image Segmentation in Video Sequences: A Probabilistic Approach", *Proc. Thirteenth Conf. on Uncertainty in Artificial Intelligence (UAI 97),* (1997), 1-3.

Jabri, S., "Detection and location of people in video images using adaptive fusion of color and edge information", *15th International Conference on Pattern Recognition,* 4, (Sep. 3-7, 2000),627-630.

Mckenna, S., "Tracking Groups of People", *Computer Vision and Image Understanding,* 80, (2000),42-56.

(Continued)

*Primary Examiner*—Gregory M Desire
(74) *Attorney, Agent, or Firm*—Schwegman, Lundberg & Woessner P.A.

(57) ABSTRACT

A method for the detection of motion in video data is disclosed. In an embodiment, a method uses a background technique for the motion detection. In another embodiment, a Gaussian Mixture Model is applied to a neighborhood or block of pixels within an image frame, thereby identifying background and foreground in the image based on said blocks.

20 Claims, 5 Drawing Sheets

OTHER PUBLICATIONS

Meyer, D., "Model based extraction of articulated objects in image sequences for gait analysis", *International Conference on Image Processing*, 3, (Oct. 26-29, 1997),78-81.

Morellas, V., "DETER: Detection of Events for Threat Evaluation and Recognition", *Machine Vision and Applications*, 15, (2003),29-45.

Stauffer, Chris, "Adaptive Background Mixture Models for Real-time Tracking", *Proceedings 1999 IEEE Computer Society Conference on Computer Vision and Pattern Recognition*, 2(2), (Jun. 1999),246-52.

Toyama, Kentaro, "Wallflower: Principles and Practice of Background Maintenance", *The Proceedings of the Seventh IEEE International Conference on Computer Vision*, vol. 1,, (Sep. 20-27, 1999),255-261.

* cited by examiner

BLOCK-BASED GAUSSIAN MIXTURE MODEL VIDEO MOTION DETECTION

TECHNICAL FIELD

Various embodiments of the invention relate to the field of video data processing, and in particular, but not by way of limitation, to motion detection in video data.

BACKGROUND

With heightened awareness about security threats, interest in video surveillance technology and its applications has become widespread. Historically, such video surveillance has used traditional closed circuit television (CCTV). However, CCTV surveillance has recently declined in popularity because of the exponentially growing presence of video networks in the security market. Video networks, and in particular intelligent video surveillance technologies, bring to the security and other industries the ability to automate an intrusion detection system, maintain the identity of the unauthorized movement during its presence on the premises, and categorize moving objects. One aspect of this, video object segmentation (also known as Video Motion Detection), is one of the most challenging tasks in video processing, and is critical for video compression standards as well as recognition, event analysis, understanding, and video manipulation.

Any video motion detection algorithm should have certain functional and performance requirements. Such requirements may include that false positives are kept to a minimum, that the detection probability is close to 100%, that the detection algorithm is insensitive to environmental variations such as snow, rain, and wind, that the algorithm works in a broad spectrum of lighting conditions (well lit to poorly lit), that the algorithm provides robust results irrespective of camera positioning, that the algorithm handles variations and clutter in a scene due to camera vibrations, overlapping objects, slow and fast moving objects, and objects arriving into and departing from the scene, and that the algorithm handles shadows and reflections. Video motion detection (VMD) therefore poses a challenge due to the numerous variations that occur in typical outdoor and indoor scenarios. These requirements are met to one degree or another by motion detection schemes that are known in the art. These known motion detection schemes fall into one of the following categories—Temporal Frame Differencing, Optical Flow, and Background Subtraction.

The basic principle of temporal differencing based schemes is the calculation of an absolute difference at each pixel between two or three consecutive frames, and the application of a threshold to extract the moving object region. Though this method is rather simple to implement, it is not entirely effective in extracting the entire moving region—especially the inner part of moving objects.

The optical flow based method of motion segmentation uses characteristics of flow vectors of moving objects over time to detect moving regions in an image sequence. For example, one known method computes a displacement vector field to initialize a contour based tracking algorithm, called active rays, for the extraction of moving objects in a gait analysis. Though optical flow based methods work effectively even under camera movement, they require extensive computational resources. Also, such methods are sensitive to noise and cannot be applied to real-time video analysis.

For background subtraction techniques, pixels are modeled in the video frame in order to classify them as background (BGND) or foreground (FGND) pixels, thereby determining the motion or lack of motion for a pixel. Particular background modeling methods include the Hidden Markov Model (HMM), adaptive background subtraction, and Gaussian Mixture Models (GMM). In most applications, these methods have been limited by the availability of high speed computational resources. Consequently, the methods that have been used were designed to handle video captured under rather restricted or controlled situations. However, with the advent of increasing processor speeds coupled with the miniaturization of such processors, systems have been designed to address situations beyond restricted or controlled scenarios in modeling real-world processes under a plethora of varying conditions.

Increased processor power has therefore made background subtraction a viable means of VMD. In particular, the separation of background (BGND) and foreground (FGND) information using a background model, followed by an adaptive model update, has become a popular approach in most VMD methods to identify and segment moving objects. The accuracy and performance of many of these modeling schemes depends largely on the model initialization procedure. Of these models, the Gaussian Mixture Model, which models the individual pixel variations over a number of frames, has been successfully used in many applications. The Gaussian Mixture Model uses Expectation Maximization (EM) based model initialization. Notwithstanding the success of the Gaussian Mixture Model in many applications, it still has its problems, such as rather high resource requirements. Consequently, video processing applications that use background modeling methods such as the Gaussian Mixture Model would benefit from an improvement in these background methods.

DETAILED DESCRIPTION

Figure 1A:
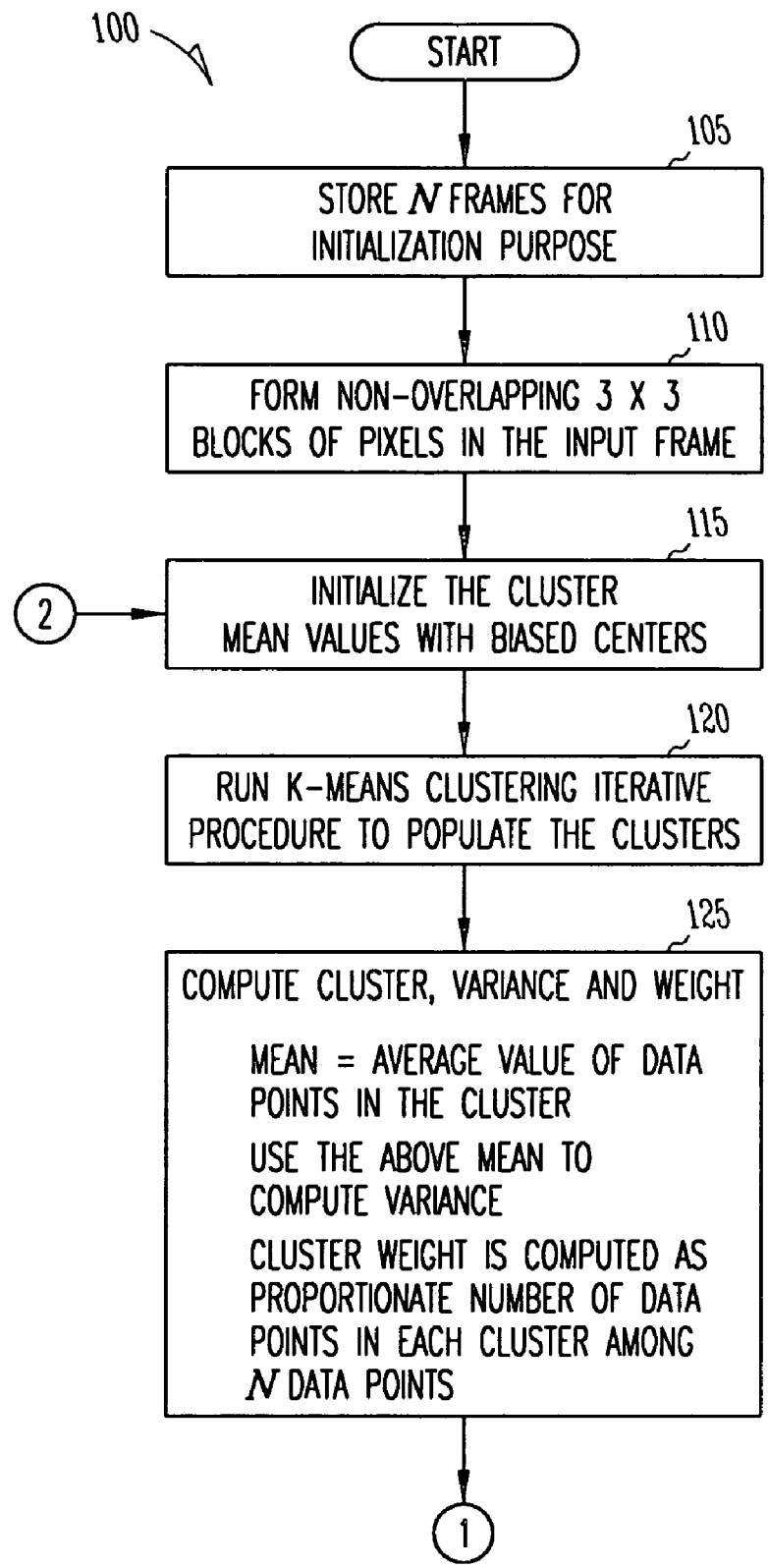
FIGS. 1A, 1B, and 1C illustrate an example embodiment of a process of a Block-based Gaussian Mixture Model.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The background subtraction method of video motion detection (VMD) maintains a background reference and classifies pixels in the current frame as either background or foreground by comparing them against the background reference. The background can be either an image or a set of statistical parameters (e.g. mean, variance, median of pixel intensities). Most algorithms that use a background reference require a learning period to generate them. Ideally, moving objects are not present during this learning period. A simple background model can be the average image intensity over some learning period described by:

$$B(x, y, T) = \frac{1}{T}\sum_{t=1}^{T} I(x, y, t)$$  Equation No. 1 where B indicates background pixel intensity values and I indicates the intensity values of images considered for building the background image. To accommodate dynamics in the scene, the background image is updated at the end of each iteration, thereby modifying Equation No. 1 as follows:

$$B(x, y, T) = \frac{(T-1)}{T} B(x, y, T-1) + \frac{1}{T} I(x, y, T)$$  Equation No. 2

After the learning period, the foreground-background segmentation can be accomplished through simple distancing measures like the Mahalanobis distance.

A problem with this approach is that it is adversely affected by lighting changes over time. This can be addressed however by a window based approach or an exponential forgetting. Since a window based approach requires a good deal of storage, an exponential forgetting scheme is often followed, and can be modeled as followed:

$$B(x,y,T) = (1-a)(x,y,T31\ 1) + aI(x,y,T)$$  Equation No. 3 where the constant a is set empirically to control the rate of adaptation (0<a<1). This depends on the frame rate and the expected rate of change of the scene.

A probabilistic approach has been used for pixel classification together with an unsupervised learning scheme for background-foreground segmentation. The algorithm models each pixel as a mixture of three probabilistic distributions. The pixel classes under consideration in this approach are moving pixels (foreground), shadow pixels, or background pixels. As a first approximation, each distribution is modeled as a Gaussian distribution parameterized by its mean, variance and a weight factor describing its contribution to an overall Gaussian mixture sum. The parameters are initialized (during learning) and updated (during segmentation) using a recursive Expectation Maximization (EM) scheme such as the following:

$$i_{x,y} = w_{x,y} \cdot (b_{x,y}, s_{x,y}, f_{x,y})$$  Equation No. 4 where
weights: $w_{x,y} = (w_f, w_s, w_v)$
background: $b_{x,y} \sim N(\mu_b, \Sigma_b)$
shadow: $s_{x,y} \sim N(\mu_s, \Sigma_s)$
foreground: $f_{x,y} \sim N(\mu_f, \Sigma_f)$ Though this method has proved to be very effective in detecting moving objects, some of the assumptions made in the initialization make it less robust. For example, the assumption that the foreground has a large variance hampers the performance of the method under extreme lighting conditions. Also, the method ignores spatial and temporal contiguity, which is considered a strong relationship among pixels.

In a Gaussian Mixture Model, the values of a particular pixel are modeled during the learning period as a mixture of Gaussian values. Based on the persistence and the variance of each of the Gaussian values of the mixture, a pixel is assigned as belonging to the background or the foreground of an image. Pixel values that do not fit the background distributions are considered foreground until there is a Gaussian distribution that includes them with sufficient, consistent evidence supporting it. With evolving consistency of evidence from incoming pixels, the Gaussian Mixture Model reviews the state of each pixel. The Gaussian Mixture Model uses two parameters—alpha, which is the learning constant, and T, which is the proportion of data to be accounted for by the background (i.e., the background threshold). The effective setting of these parameters allows the Gaussian Mixture Model to be robust under a variety of conditions such as outdoor and indoor scenes.

At any time, t, what is known about a particular pixel, {x0, y0}, is its history (over a period of time):

$$\{X_1, \ldots, X_t\} = \{I(x_0, y_0, i): 1 \leq i \leq t\}$$  Equation No. 5

The recent history of each pixel, {X1, ..., Xt}, is modeled by a mixture of K Gaussian distributions. Then, the probability of observing the current pixel value is:

$$P(X_t) = \sum_{i=1}^{K} \omega_{i,t} * \eta(X_t, \mu_{i,t}, \Sigma_{i,t})$$  Equation No. 6 where K is the number of distributions, $\omega_{i,t}$ is an estimate of the weight (what portion of the data is accounted for by this Gaussian) of the $i^{th}$ Gaussian in the mixture at time t, $\mu_{i,t}$ is the mean value of the $i^{th}$ Gaussian in the mixture at time t, $\Sigma_{i,t}$ is the covariance matrix of the $i^{th}$ Gaussian in the mixture at time t, and $\eta$ is a Gaussian probability density function, defined in particular as follows:

$$\eta(X_t, \mu, \Sigma) = \frac{1}{(2\pi)^{\frac{n}{2}}|\Sigma|^{\frac{1}{2}}} e^{-\frac{1}{2}(X_t-\mu_t)^T \Sigma^{-1}(X_t-\mu_t)}$$  Equation No. 7

K is determined by the available memory and computational power. Every new pixel value, $X_t$, is checked against the existing K Gaussian distributions until a match is found. A match is defined as a pixel value within 2.5 standard deviations of a distribution. If none of the K distributions match the current pixel value, the least probable distribution is replaced with a distribution with the current value as its mean value, an initially high variance, and low prior weight.

In one particular Gaussian Mixture Model known as the Pixel-Based Gaussian Mixture Method (PGMM), each pixel X is considered as a mixture of three time-varying Gaussian or Normal distributions:

$$X \sim \sum_{i=1}^{3} \pi_i N_3(\mu_i, \Sigma_i),$$

where:

-continued $$\pi_i \geq 0, i = 1, \ldots, 3 \text{ and } \sum_{i=1}^{3} \pi_i = 1$$

are the mixing proportions (weights) and $N_3$ denotes a trivariate Gaussian distribution with vector mean μ and variance-covariance matrix Σ. The distributions are trivariate to account for the three component colors (Red, Green, and Blue) of each pixel in the general case of a color camera. Other similar methods initialize the pixel values either with random numbers or with a K-means algorithm. Random initialization results in slower learning during the dynamic mixture model update phase. Initialization with the K-means method gives better but not optimal results. K-means is not an optimal method since it commits each incoming data point to a particular distribution in the mixture model. Ideally, each data point should be partially committed to all of the existing distributions. The level of its commitment would be described by appropriate weighting factors. The EM algorithm is then used to estimate the parameters of the initial distribution: σ's, μ's and Σ's, for the three color components for every pixel X in the scene. Since the EM algorithm is applied on-line over N frames, then for each pixel there are N data points in time. These data points $x_j$, j=1, . . . , N are triplets:

$$x_j = \begin{pmatrix} x_j^R \\ x_j^G \\ x_j^B \end{pmatrix},$$

where $x_j^R$, $x_j^G$ and $x_j^B$ stand for the measurement received from the Red, Green, and Blue channels of the camera for the specific pixel at time j. These data x1, x2, . . . , xN are assumed to be sampled from a mixture of three trivariate Gaussians, $$x_j \sim \sum_{i=1}^{3} \pi_i N_3 \left[ \begin{pmatrix} \mu_i^R \\ \mu_i^G \\ \mu_i^B \end{pmatrix}, \sigma_i^2 I \right],$$

where the variance-covariance matrix is assumed to be diagonal with $x_j^R$, $x_j^G$ and $x_j^B$ having identical variance within each normal component, but not across all components. The algorithm is provided with some crude estimates of the parameters of interest, i.e. the variances and the means. These estimates are obtained using the method of K-means. The EM process is applied for every pixel in the frame. The result is a mixture model of three normal distributions per pixel. These normal distributions represent three potentially different states for each pixel. These states could be background states, foreground states, or transient foreground states. The EM algorithm is known in the art as a superior initialization method that imbues fast learning and exceptional stability to the subsequent main stage of object segmentation. This is more so when initialization happens during challenging weather conditions like fast moving objects such as clouds or other cases of multi-modal background. It is worth noting that both during initialization and the regular processing, each color component of a pixel is represented as a mixture of three Gaussians. Three normal distributions per color channel is a sufficiently rich representation scheme to capture natural motion and phenomena. Adding more Gaussians beyond that simply increases the computational load without improving the quality of foreground-background segmentation.

In an embodiment, non-overlapping neighborhoods (or blocks) around given candidate pixels in a given frame are used instead of just the candidate pixel in the above discussed conventional PGMM both for initialization and model adaptation. This initialization and adaptation is applied to a plurality of frames, thereby producing historical motion data. Then, the pixels in the same positions in blocks in other images are used for further processing to identify background and foreground pixels.

In conventional PGMM, the initialization (done through an expectation-maximization method) uses k-means clustering of the pixel samples taken from the first N number of frames (typically N ranges from 50 to 70 depending on the speed of the event captured in the video). In the course of this procedure, a Gaussian mixture is built for each pixel in the initial frames. Since the video frame capture rate is rather high (typically 25 to 30 fps), the Gaussian Mixture Method, if performed on a pixel by pixel basis, results in only one distribution (out of the GMM) becoming populated with target pixels, and all other clusters coming out of the k-means clustering scheme having no members. This defeats the objective of using the Gaussian Mixture Method and does not result in a mixture model or set of distributions, further resulting in zero means and zero variances. This further leads to the ineffective capture of the pixel variations in the background model, and it also amounts to divide-by-zero computations in further stages of the processing.

One or more embodiments overcome the above problem by building a Gaussian mixture for a block of pixels, e.g., a 3 by 3 neighborhood of pixels, rather than for a single pixel. This strengthens the mixture model parameters (π, μ, σ). The mixture models need to be obtained only for non-overlapping neighborhoods, thus reducing the number of computations. This may be referred to as a Block-based Gaussian Mixture Method (BGMM) for video motion detection. In a block-based embodiment, a Gaussian mixture of a block of pixels around a candidate pixel (rather than a single pixel) is calculated to strengthen the initialization scheme and the mixture properties.

Figure 1B:
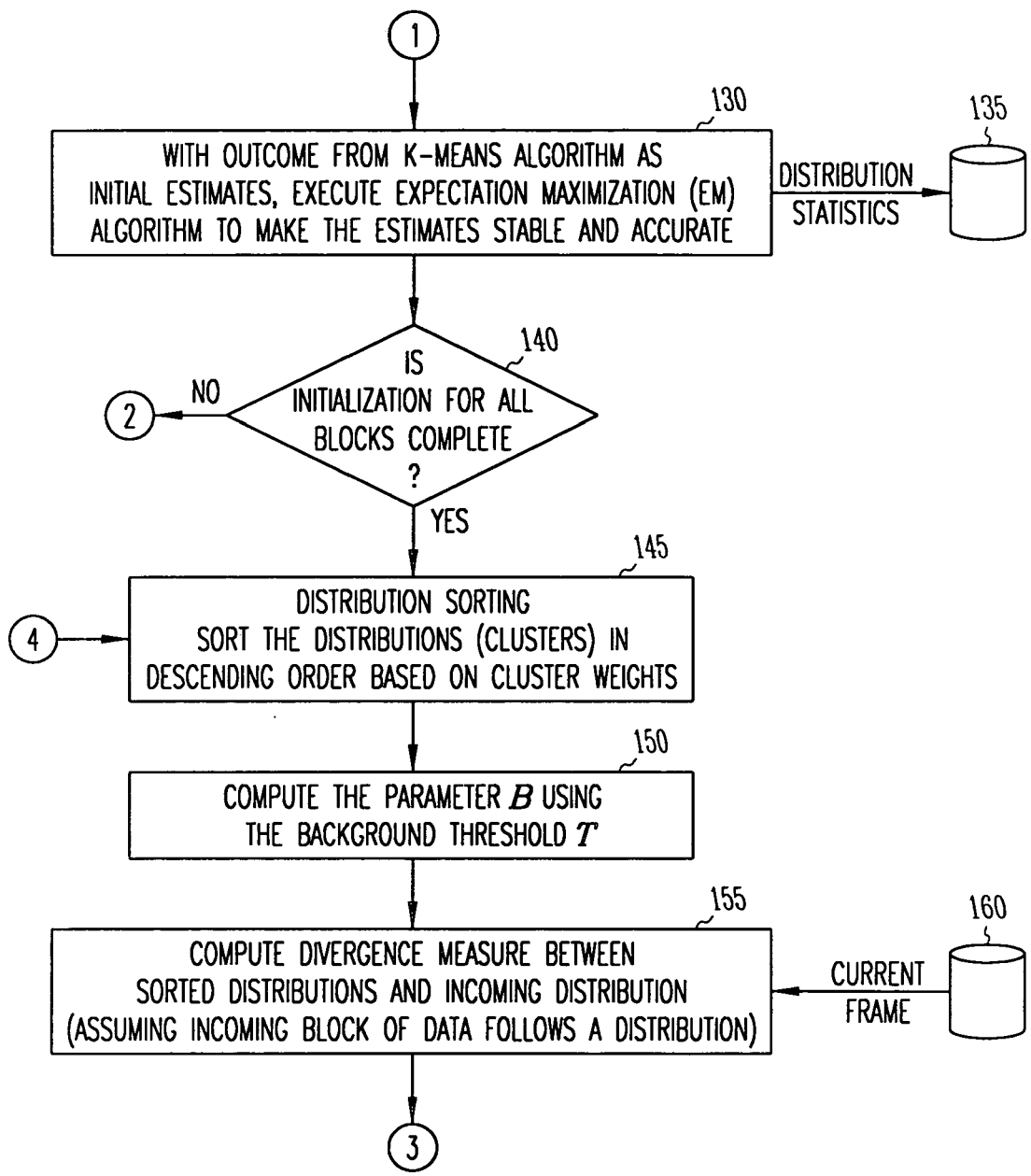
Figure 1C:
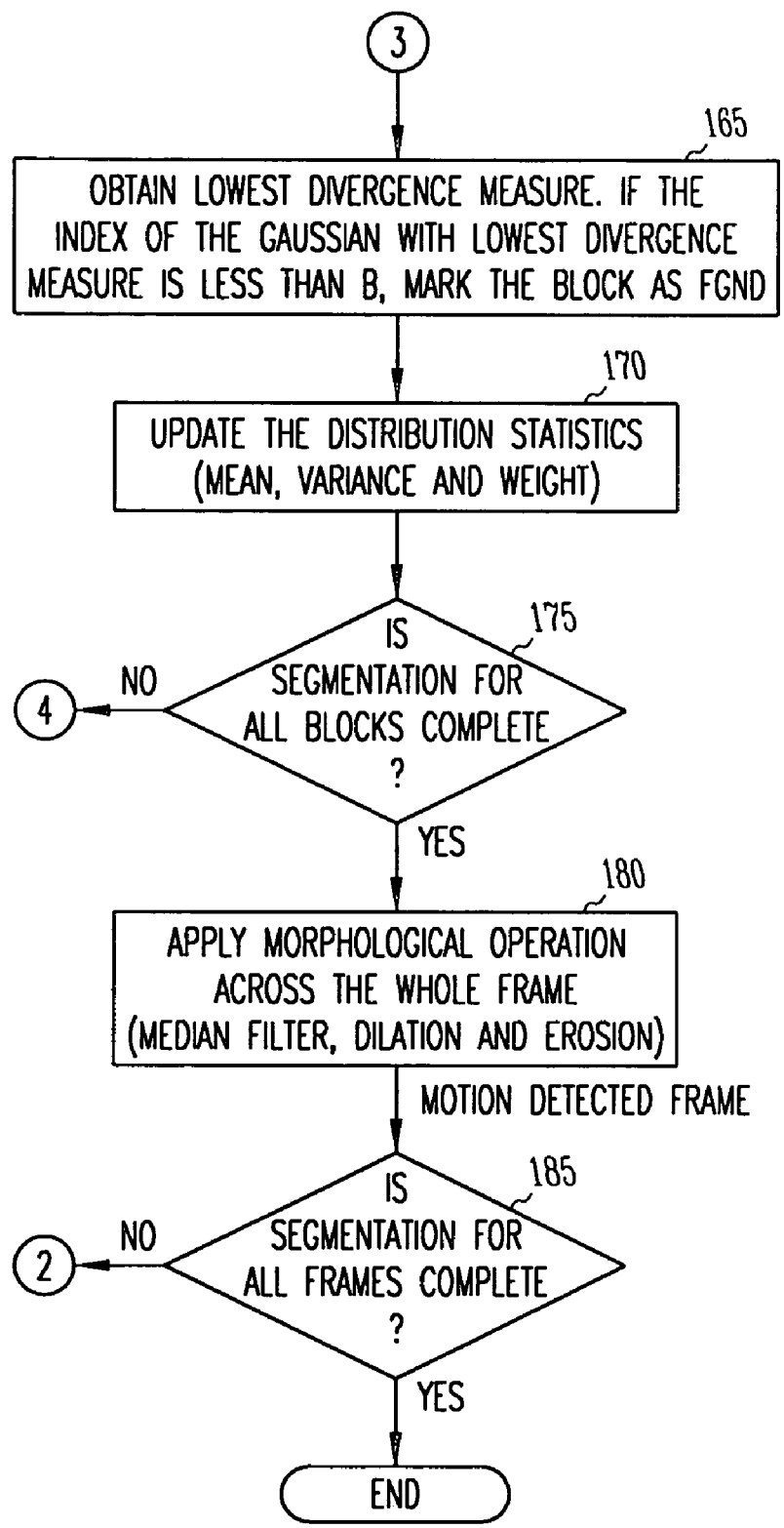
Figure 2:
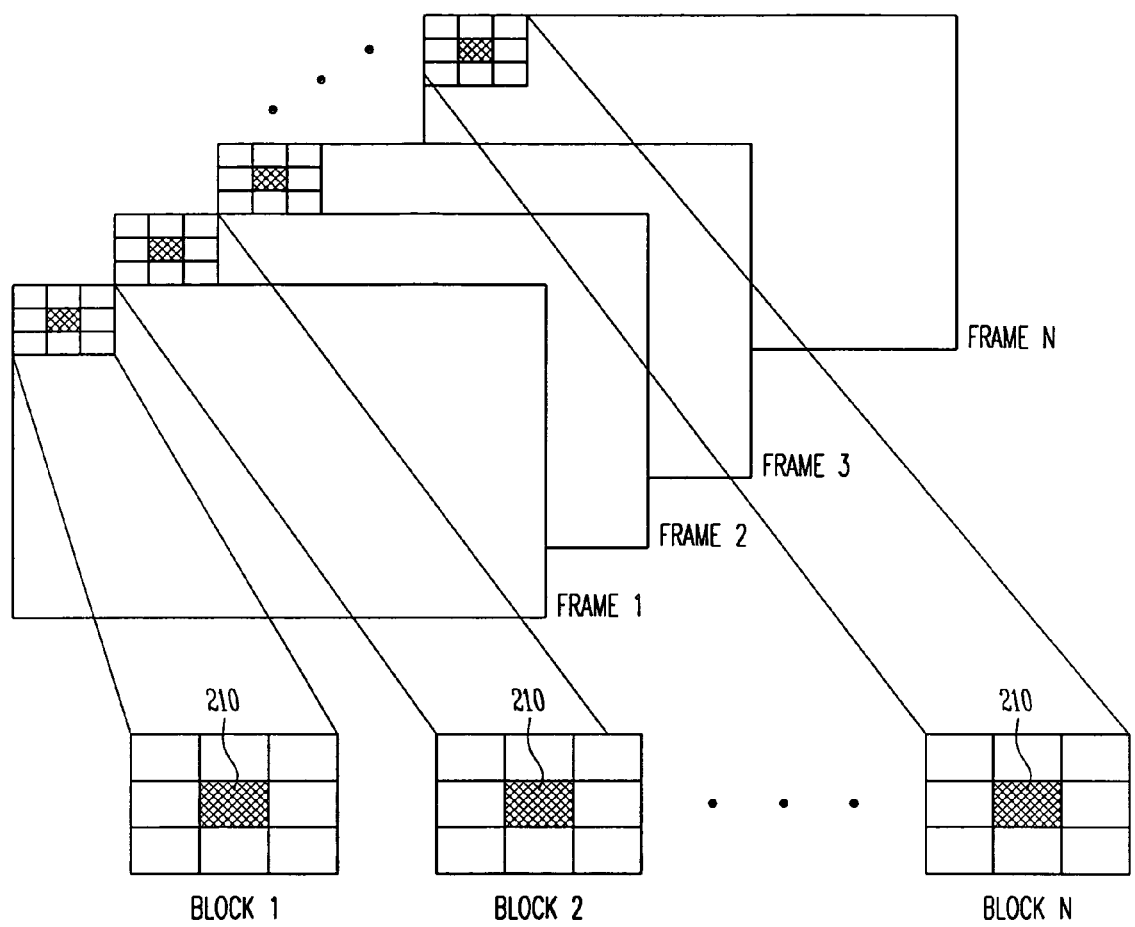
FIG. 2 illustrates a graphical example of a Block-based Gaussian Mixture Model for video processing.

FIGS. 1A, 1B, and 1C illustrate an example embodiment of a Block-based Gaussian Mixture Method 100 (BGMM). In the process 100 of FIGS. 1A, 1B, and 1C, a certain number of frames N are stored for initialization purposes at block 105, and each pixel X in a PGMM is replaced by a neighborhood block such as a 3 by 3 block at 110. This block may be identified as $X_{Neigh}$. Referring to FIG. 2, the processing in BGMM begins with the candidate pixel 210 of $X_{Neigh}$ at a certain location in the frame, and ends with the pixel in the last row and the last column of $X_{Neigh}$. If N frames are considered for initialization at block 115, there is then a total of 9N data points per color component (R,G,B) to be clustered into three normal (Gaussian) distributions. This is illustrated graphically in FIG. 2. While the pixels around the border of the frame are not considered candidate pixels, they participate as the neighbors in the mixture of the three (R,G,B) time-varying Gaussian distributions.

The mixing proportions, $\pi_{Neigh}$'s (weights), for the three color component distributions are derived as the proportionate population of each of the distributions for a given block, unlike the arbitrarily chosen initial values in the PGMM. The distributions are trivariate as in the PGMM to account for the three component colors (Red, Green, and Blue) of each block of pixels. Similar to the PGMM, the BGMM also initializes the block parameters (block mean $\mu_{Neigh}$ and block variance $\sigma_{Neigh}$) with a K-means algorithm at blocks 120, 125. Random initialization of K-means is not preferred in the BGMM as it defeats the purpose of block analysis. Initialization with the K-means method provides a stable initialization. Unlike in the PGMM, the BGMM suggests committing the weight factor $\pi_{Neigh}$ to specific distributions due to the clearly available statistics.

The converged block parameters $\sigma_{Neigh}$'s, $\mu_{Neigh}$'s and $\pi_{Neigh}$'s from the K-means cluster estimation for the three color components are taken as the initial parameters for the start of background/foreground classification—i.e., for moving object segmentation. In an embodiment, the output of the K-means algorithm is used as an initial estimate, and an Expectation Maximization algorithm is executed to make the estimates stable and accurate at block 130. Thereafter, distribution statistics are stored at 135. A check is made at block 140 to see if initialization has been completed for all blocks, and if not, processing returns to block 115 to initialize the remaining blocks.

In another embodiment, there is no need for another level of parameter tuning through the Expectation Maximization (EM) algorithm as was the case in the PGMM. The result is a mixture model of three normal distributions (for each R,G,B color channel) per pixel-block. These normal distributions represent three potentially different states for each pixel-block—that is, background states, foreground states, or transient foreground states. As with the PGMM, the BGMM also uses the three normal distributions per color channel for a sufficiently rich representation scheme to capture natural motion and phenomena. The three distributions are ordered at block 145 based on the weight parameter $\pi_{Neigh}$. Similar to the procedure in the PGMM, the B number of distributions are labeled as belonging to the background distributions, and the rest as belonging to the foreground, based on a parameter T (background threshold) at block 150. In an embodiment, the optimal value of the parameter T is determined based on experiments with typical video data sets. In these experiments, the value of the T parameter is adjusted so that the number of false motion detections are as low as possible across many datasets.

In an embodiment, the background/foreground classification begins with the incoming "N+1"th frame 160. In particular, from the incoming frame, and in particular, a block of pixels in the incoming frame, the block mean $\mu_{new}$ and block variance $\sigma_{new}$ of the intensity values for each of the R, G, and B channels are computed. The Lp distance, also known as the Lp-norm, between the new distribution and the existing distributions are computed at block 155 based on the parameters $\mu$ and $\sigma$. The new distribution is the $\mu$ and the $\sigma$ for the RGB pixels in the current frame, and the existing distribution is the $\mu$ and the $\sigma$ for the frames 1 through N. Since blocks of pixels are used during the Gaussian process formation, simple distance measures are sufficient. Based on the minimum distance, the new distribution is classified or labeled as background at block 165 if it matches the distributions with indices less than B. Otherwise, the unmatched distribution is replaced with the new distribution. The weight for the new distribution is then computed as in the PGMM. The parameter update for $\mu$ and $\sigma$ are done at block 170 as indicated in the PGMM. In another embodiment, an alternative method of updating these parameters is executed with the method of sample averages. If motion segmentation for all blocks is not complete at 175, the process 100 returns to block 145. If segmentation for all blocks is completed, morphological operations (median filter, dilation, and erosion) are applied across the whole frame at 180. If segmentation for all the frames is not completed at 185, process 100 returns to block 115.

One or more embodiments of the BGMM provide distinct advantages over the existing PGMM based video processes used in video surveillance and other applications. The BGMM is more robust as compared to the PGMM. Also, computational requirements and resources are reduced since the BGMM uses non-overlapping pixel-blocks and not individual pixel processing. The BGMM also eliminates the need for EM based tuning of the multivariate Gaussian process. Further, the BGMM may use a simpler Lp distance for comparing distributions as against the existing complex divergence measures. All these factors contribute to the better performance of the BGMM over the existing PGMM.

Figure 3:
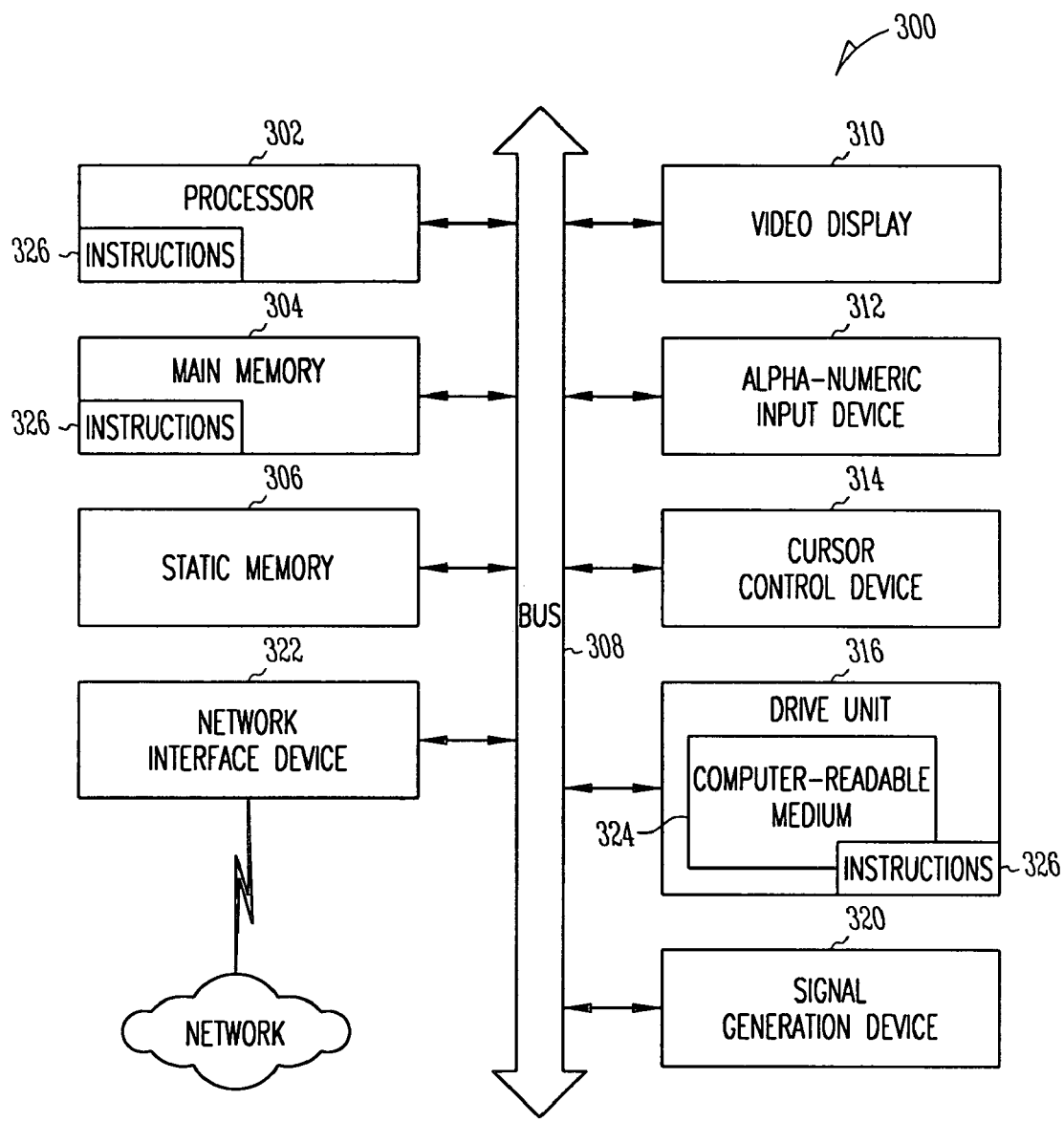
FIG. 3 illustrates an example embodiment of a computer system upon which an embodiment of the present invention may operate.

FIG. 3 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a system and method for motion detection in video data has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A method comprising:
   using a computer processor to select one or more blocks of pixels;
   using the computer processor to initialize a plurality of image frames;
   receiving at the computer processor parameters for a background/foreground classification;
   using the computer processor to produce a mixture model of normal distributions for said one or more blocks;
   using the computer processor to order said normal distributions based on a weight parameter;
   using the computer processor to identify said one or more blocks as background or foreground; and
   displaying the one or more blocks are background or foreground on a video display unit.

2. The method of claim 1, wherein said normal distributions comprise a Gaussian Mixture for each channel in said one or more each blocks.

3. The method of claim 2, wherein said Gaussian Mixture comprises means and variances for said one or more blocks of pixels.

4. The method of claim 3, further comprising converging said means and said variances.

5. The method of claim 3, further comprising weighting said Gaussian Mixture based on a proportionate population of said Gaussian Mixture per said one or more blocks of pixels.

6. The method of claim 3, wherein said computation of said means and variances further comprises;
   initializing a block mean with a K-means algorithm; and
   initializing a block variance with a K-means algorithm.

7. The method of claim 3, wherein said Gaussian Mixture represents a background state, a foreground state, or a transient foreground state.

8. The method of claim 1, wherein said one or more blocks of pixels comprises a 3 by 3 matrix of pixels.

9. The method of claim 1, wherein said one or more blocks are non-overlapping in an image frame, and further wherein said one or more blocks correlate to one or more blocks in other image frames.

10. The method of claim 1, further comprising labeling said block as background based on a background threshold parameter T.

11. A method comprising:
    using a computer processor to form blocks of pixels in an image frame;
    using the computer processor to populate said blocks of pixels with a K-means clustering procedure;
    using the computer processor to compute cluster means, cluster variances, and cluster weights for said blocks of pixels;
    using the computer processor to apply an expectation maximization algorithm to an outcome from said K-means clustering procedure;
    using the computer processor to sort said blocks of pixels in descending order based on said cluster weights;
    using the computer processor to compute a background parameter using a background threshold;
    using the computer processor to compute divergence measures between said sorted clusters and incoming clusters;
    using the computer processor to mark a particular block of pixels as foreground if the lowest divergence measure for said particular block of pixels is less than said background parameter for said particular block of pixels; and
    displaying the particular block of pixels marked as foreground on a video display unit.

12. The method of claim 11, wherein each of said blocks comprise a 3 by 3 matrix, and further wherein each of said blocks do not overlap.

13. The method of claim 11, wherein said cluster means comprise biased centers.

14. The method of claim 11, further comprising updating said cluster means, said cluster variances, and said cluster weights.

15. The method of claim 14, further comprising applying a morphological operation across said image frame, thereby detecting motion is said image frame.

16. A tangible computer readable medium, said tangible computer readable medium comprising a computer program embodied thereon for executing a process comprising:
    forming blocks of pixels in an image frame;
    populating said blocks of pixels with a K-means clustering procedure;
    computing cluster means, cluster variances, and cluster weights for said blocks of pixels;
    applying an expectation maximization algorithm to an outcome from said K-means clustering procedure;
    sorting said blocks of pixels in descending order based on said cluster weights;
    computing a background parameter using a background threshold;
    computing divergence measures between said sorted clusters and incoming clusters; and
    marking a particular block of pixels as foreground if the lowest divergence measure for said particular block of pixels is less than said background parameter for said particular block of pixels.

17. The tangible computer readable medium of claim 16, wherein each of said blocks comprise a 3 by 3 matrix, and further wherein each of said blocks do not overlap.

18. The tangible computer readable medium of claim 16, wherein said cluster means comprise biased centers.

19. The tangible computer readable medium of claim 16, further comprising updating said cluster means, said cluster variances, and said cluster weights.

20. The tangible computer readable medium of claim 19, further comprising applying a morphological operation across said image frame, thereby detecting motion is said image frame.

* * * * *